United States Patent
Olechowski, III et al.

(10) Patent No.: US 10,762,374 B2
(45) Date of Patent: Sep. 1, 2020

(54) HIGH ACCURACY IMAGE IDENTIFICATION SYSTEM

(71) Applicant: Blinkfire Analytics, Inc., Glen Ellyn, IL (US)

(72) Inventors: Stephen Joseph Olechowski, III, Glen Ellyn, IL (US); Nan Jiang, Lincolnshire, IL (US); Alejandro Tatay de Pascual, Valencia (ES)

(73) Assignee: Blinkfire Analytics, Inc., Glen Ellyn, IL (US)

( * ) Notice: Subject to any disclaimer, the term of this patent is extended or adjusted under 35 U.S.C. 154(b) by 0 days.

(21) Appl. No.: 14/998,289

(22) Filed: Dec. 23, 2015

(65) Prior Publication Data

US 2016/0239719 A1    Aug. 18, 2016

Related U.S. Application Data

(60) Provisional application No. 62/098,241, filed on Dec. 30, 2014.

(51) Int. Cl.
| | |
|---|---|
| *G06K 9/32* | (2006.01) |
| *G06K 9/52* | (2006.01) |
| *G06K 9/62* | (2006.01) |
| *G06F 16/51* | (2019.01) |
| *G06F 16/583* | (2019.01) |
| *G06K 9/46* | (2006.01) |
| *G06K 9/00* | (2006.01) |

(52) U.S. Cl.
CPC ........... *G06K 9/3258* (2013.01); *G06F 16/51* (2019.01); *G06F 16/5854* (2019.01); *G06K 9/3241* (2013.01); *G06K 9/52* (2013.01); *G06K 9/6211* (2013.01); *G06K 9/00536* (2013.01); *G06K 9/4604* (2013.01); *G06K 2209/25* (2013.01)

(58) Field of Classification Search
CPC .......... G06K 2209/01; G06K 2209/25; G06K 9/00456; G06K 9/3216; G06K 9/6201; G06K 9/6215; G06K 9/3241; G06K 9/6204; G06K 9/00536; G06K 9/4604; G06K 9/6211; G06K 9/3258; G06K 9/52; G06F 16/51; G06F 16/5854
See application file for complete search history.

(56) References Cited

U.S. PATENT DOCUMENTS

| | | | |
|---|---|---|---|
| 9,875,234 B2 | 1/2018 | Myslinski | |
| 10,192,131 B2 | 1/2019 | Olechowski et al. | |
| 2005/0018904 A1* | 1/2005 | Davis | G06K 9/6206 382/181 |
| 2007/0022329 A1* | 1/2007 | Adamek | G06F 16/5854 714/701 |
| 2008/0144942 A1* | 6/2008 | Besley | G06K 9/00456 382/209 |
| 2009/0123025 A1* | 5/2009 | Deng | G06K 9/00711 382/100 |
| 2011/0145064 A1 | 6/2011 | Anderson et al. | |

(Continued)

*Primary Examiner* — Kenny A Cese
(74) *Attorney, Agent, or Firm* — Carr & Ferrell LLP

(57) ABSTRACT

An image identification system may identify key points on a known image and an unidentified image. One or more geometric shapes may be formed from the key points. A match between the unidentified image and the know image nay be determined by comparison of the respective geometric shapes.

16 Claims, 15 Drawing Sheets

(56) References Cited

U.S. PATENT DOCUMENTS

| | | | |
|---|---|---|---|
| 2012/0263385 A1* | 10/2012 | van Zwol | G06K 9/6202 |
| | | | 382/201 |
| 2012/0284105 A1* | 11/2012 | Li | G06Q 30/02 |
| | | | 705/14.23 |
| 2013/0073388 A1 | 3/2013 | Heath | |
| 2013/0085803 A1 | 4/2013 | Mauro et al. | |
| 2013/0325550 A1 | 12/2013 | Varghese et al. | |
| 2014/0052527 A1* | 2/2014 | Roundtree | G06Q 30/0245 |
| | | | 705/14.44 |
| 2014/0052555 A1 | 2/2014 | MacIntosh | |
| 2014/0219569 A1* | 8/2014 | Manson | G06K 9/6201 |
| | | | 382/201 |
| 2015/0023602 A1* | 1/2015 | Wnuk | G06F 17/30247 |
| | | | 382/190 |
| 2015/0332317 A1 | 11/2015 | Cui et al. | |
| 2016/0042253 A1* | 2/2016 | Sawhney | G06F 16/50 |
| | | | 382/190 |
| 2016/0189200 A1 | 6/2016 | Olechowski et al. | |
| 2018/0349726 A1 | 12/2018 | Olechowski et al. | |

\* cited by examiner

| 105 | 110 | 115 | 125 |
|---|---|---|---|
| 1394812340_advocare | advocare | Context Matching  Update | 2014-09-19 18:37:30 |
| 1396618885_aeroport-castello | aeroport-castello | Context Matching  Update | 2014-09-19 18:37:31 |
| 1410100891_aia | aia | Context Matching  Update | 2014-09-19 18:37:32 |
| 1410100921_aia | aia | Context Matching  Update | 2014-09-19 18:37:33 |
| 1387459766_alaska-airlines | alaska-airlines | Context Matching  Update | 2014-09-19 18:37:35 |
| 1392216723_alaska-airlines | alaska-airlines | Context Matching  Update | 2014-09-19 18:37:37 |
| 1401897704_aldi-usa | aldi-usa | Context Matching  Update | 2014-09-19 18:37:38 |
| 1409759315_allstate | allstate | Context Matching  Update | 2014-09-19 18:37:41 |

FIG. 1

↔ All sponsors

Spotted Logos

| ◼ Positive | ✕ Negative | - Unmarked | ON | OFF | FLANN | Cascade | To be reviewed | reviewed |

300

Next

FIG. 3

HIGH ACCURACY IMAGE IDENTIFICATION SYSTEM

CROSS-REFERENCE TO RELATED APPLICATIONS

The present application claims priority to provisional U.S. Patent Application Ser. No. 62/098,241, filed on Dec. 30, 2014, titled "High Accuracy Image Identification in Social Media," which is hereby incorporated by reference in its entirety.

FIELD OF THE INVENTION

The present disclosure relates generally to the field of image identification, and more specifically to systems and methods for identifying an image based on a comparison of key points with a known image.

SUMMARY

Various embodiments of the present disclosure may be directed to a secure autonomous intelligent agent server performing a method for image identification. The method may comprise creating a database of known logos. The database may comprise vertices of geometric shapes formed from the known logos. An unidentified logo may be obtained, and key points may be identified on the unidentified logo. A geometric shape may be constructed from the key points of the unidentified logo, and vertices of the geometric shape of the unidentified logo may be calculated. The vertices of the geometric shape of the unidentified logo may be matched with the vertices of the geometric shape of at least one of the known logos.

According to additional exemplary embodiments, the present disclosure may be directed to a secure autonomous intelligent agent server performing a method for image identification. The method may comprise creating a database of known logos. The database may comprise vertices of geometric shapes formed from the known logos. One or more variations of each known logo may be created. The variations may comprise the known logo portrayed in varying levels of blur. Geometric shapes may be formed from the blurred logos, and vertices of the geometric shapes may be calculated. The vertices of the geometric shapes formed from the blurred images may be added to the database. An unidentified logo may be obtained, and key points may be identified on the unidentified logo. A geometric shape may be constructed from the key points of the unidentified logo, and vertices of the geometric shape of the unidentified logo may be calculated. The vertices of the geometric shape of the unidentified logo may be matched with the vertices of the geometric shape of at least one of the known logos and blurred logos.

According to still further exemplary embodiments, the present disclosure may be directed to non-transitory computer readable media as executed by a system controller comprising a specialized chip to perform a method for image identification. The method may comprise creating a database of known logos. The database may comprise vertices of geometric shapes formed from the known logos. An unidentified logo may be obtained, and key points may be identified on the unidentified logo. A geometric shape may be constructed from the key points of the unidentified logo, and vertices of the geometric shape of the unidentified logo may be calculated. The vertices of the geometric shape of the unidentified logo may be matched with the vertices of the geometric shape of at least one of the known logos.

BRIEF DESCRIPTION OF THE DRAWINGS

FIG. 1 is a screen shot of an exemplary image identification system according to various embodiments.

FIG. 3 is a screen shot of an exemplary image identification system according to various embodiments.

DETAILED DESCRIPTION

Humans are able to identify objects with relative ease, even when the object is viewed as a cluttered, occluded, and unfocused image, and under varying lighting conditions. Mimicking human object recognition has proven difficult, likely because the human brain uses a number of different techniques in the identification process. Shape, texture, color, context, and many other inputs are likely sorted and matched by various techniques in the brain to known objects and then a decision is made as to the identity of the unknown object.

Image identification or recognition systems may be used to automate identification of an image, photo or likeness or a person or physical object. These systems primarily operate by using a comparison of a variety of features. For example, facial recognition systems may evaluate facial shape and the relative location of eyes, nose and mouth on the face of an unidentified photo and compare these values to similar values for photos if known persons. A variety of algorithms and techniques have been devised to automate the identification process.

The present disclosure is directed to systems and methods for high accuracy image identification. Various embodiments may be used to identify logos in images posted on a network, such as images posted on social media sites such as Facebook, Twitter, Flickr, LinkedIn, Pinterest, Instagram, Tagged, and the like. In order to identify unidentified logos, a database may first be established of known logos. The database may comprise logo data obtained from a variety of algorithms according to various embodiments, such as a key-point matching algorithm, a template matching algorithm, an edge matching algorithm, or a context matching algorithm.

FIG. 1 is a screen shot 100 of a computerized system to identify images, such as logos. The screen shot 100 illustrates part of a system to input known logos into a database. The first column 100 comprises a thumbnail image of the logo and a filename, and the second column 110 lists the name of the company or product with which the logo is associated. The third column comprises a dropdown menu for an operator to select which algorithm provides the best matching result. The desired algorithm name is chosen from the dropdown menu, then the update button 120 may be clicked. The date and time of the update is recorded in the fourth column 124.

Figure 2:
FIG. 2 is a screen shot of an exemplary image identification system according to various embodiments.
Figure 4:
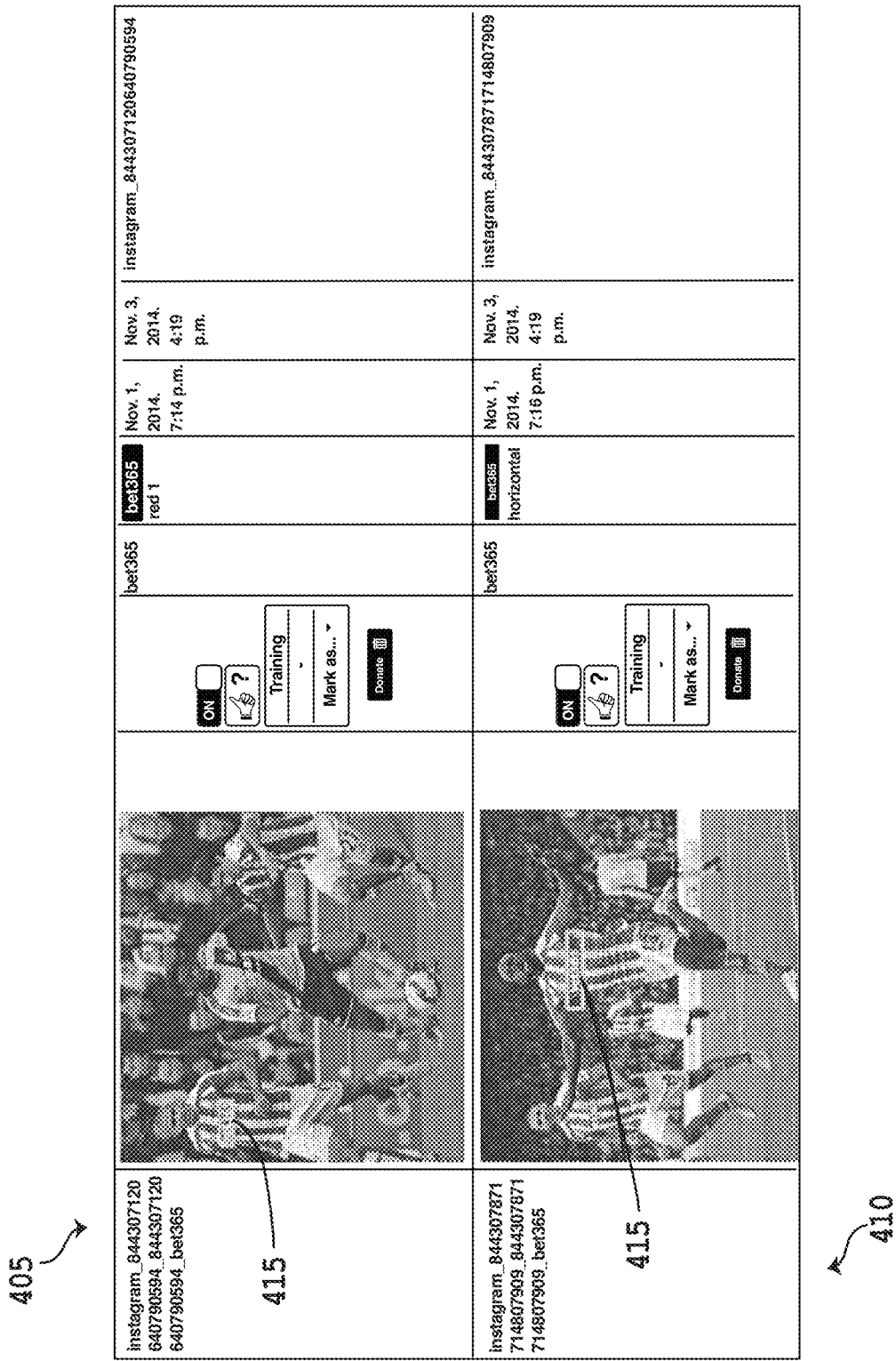
FIG. 4 is a screen shot of an exemplary image identification system according to various embodiments.
Figure 5:
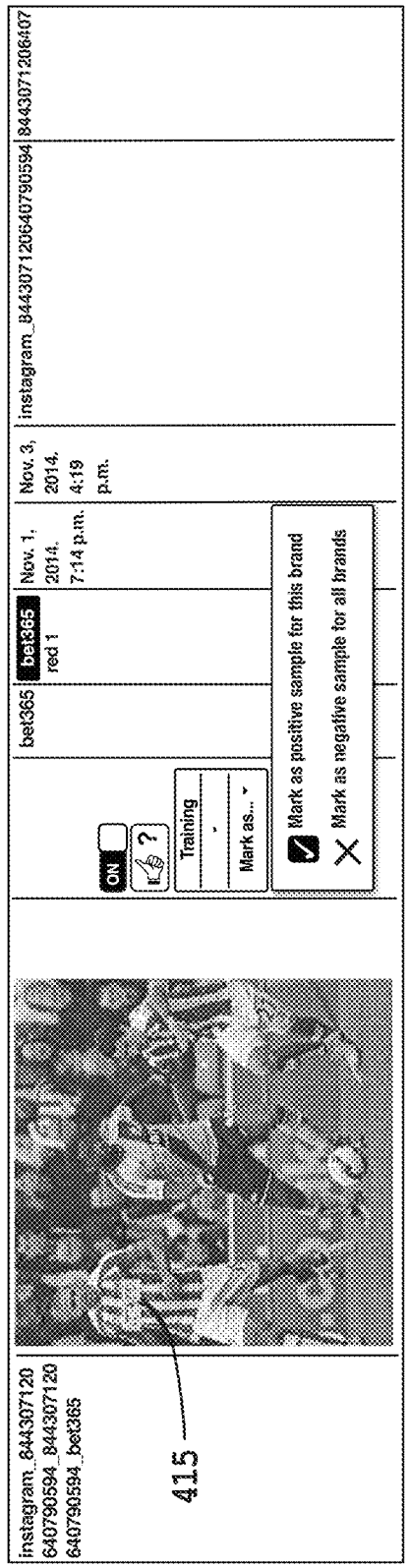
FIG. 5 is a screen shot of an exemplary image identification system according to various embodiments.

FIGS. 2 through 5 illustrate further screen shots of the operation of the system according to various embodiments after an unidentified logo is identified and entered into the system. FIGS. 2 and 3 are screenshots 200 and 300, respectively, in which the operator can evaluate an identified logo, determine whether the system has properly identified the logo and assess whether the logo is portrayed in a positive or negative manner. FIG. 4 illustrates two entries 405, 410 for images obtained from Instagram postings where the logo 415 for "bet365" has been identified according to various embodiments. FIG. 5 illustrates the first entry 405 in further detail and how the operator may mark the image with the logo 415 as portraying the logo positively or negatively.

Figure 6:
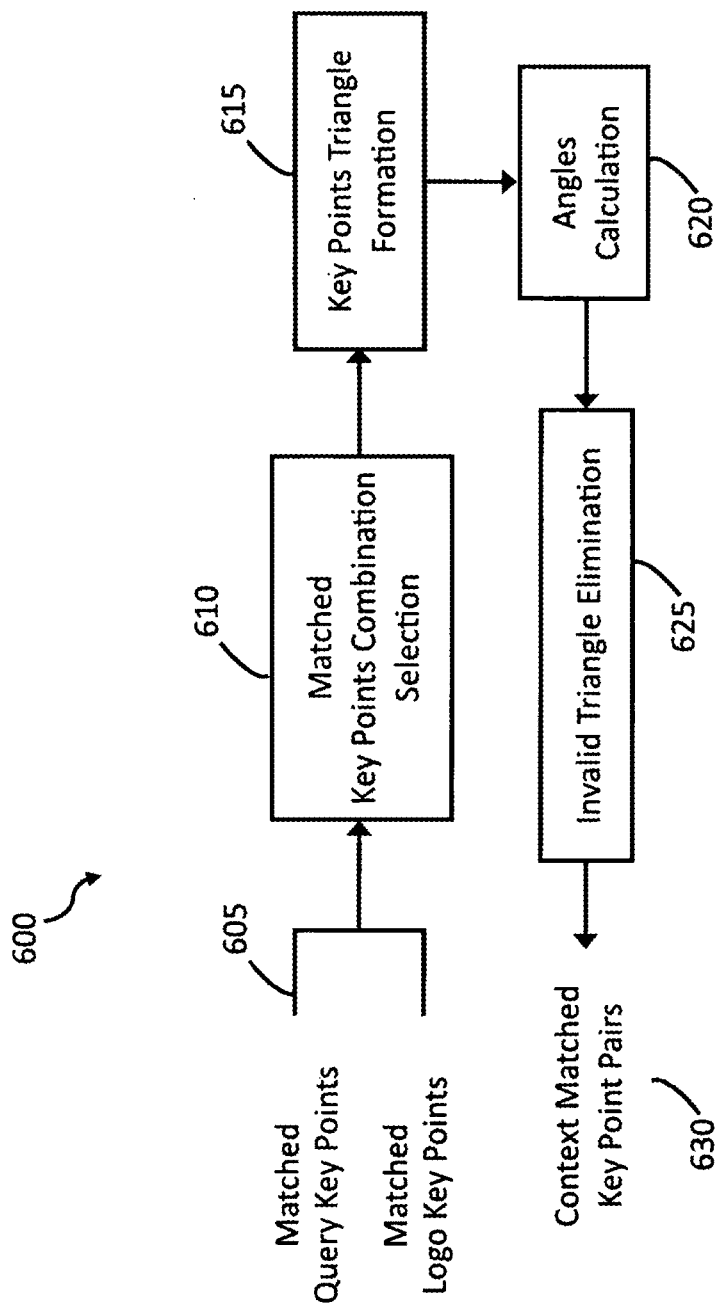
FIG. 6 is a flow diagram of an exemplary method for an image identification system according to various embodiments.

In order for the system to process an image as described above for FIGS. 1 through 5, an image containing an unidentified logo may be obtained. The discussion below addresses the use of the context matching algorithm identification process. FIG. 6 illustrates the basic steps of the context matching algorithm 600 according to various embodiments. At step 605, key points are identified on each known logo in a database, as well as the unidentified logo. At step 610, groups of the key points in each known logo and the unidentified logo are combined, and these combinations are assembled to form a geometric shape, such as a triangle, at step 615. The angle of each of the vertices of each geometric shape (such as a triangle) is calculated at step 620. At step 625, a comparison is conducted between the vertices of the geometric shape constructed from the unidentified logo and the vertices of the geometric shapes constructed from the known logos. Known logos for which the vertices do not match that of the unidentified logo are eliminated, and the resulting matching vertices identify the unidentified logo at step 630. These steps are discussed in more detail below.

Figure 7:
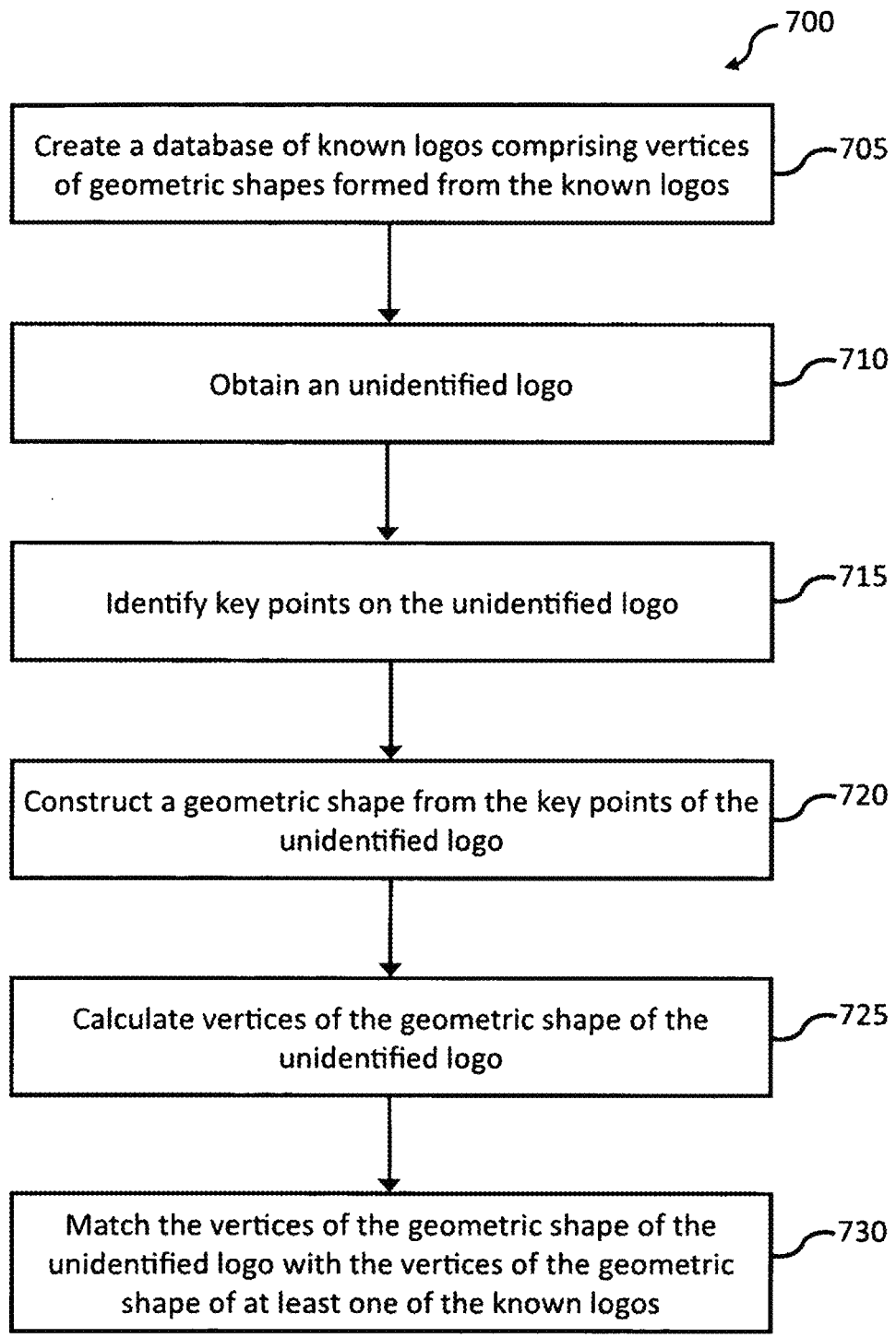
FIG. 7 is a flow diagram of an exemplary method for an image identification system according to various embodiments.

FIG. 7 illustrates a flow diagram of an exemplary method 700 for a method for image identification according to various embodiments. A database may be created at step 705. The database may comprise known logos and vertices of geometric shapes formed form the known logos. Construction of the geometric shapes is detailed below with respect to FIGS. 7 through 9. At step 710, an unidentified logo may be obtained. According to various embodiments, the unidentified logo may be obtained from a computer network. For example, images posted on social media sites may be gathered by a variety of programs, algorithms and services. Additionally, images may be found on forums, blogs, video and image sharing sites, review sites, classified advertisement sites, question and answer sites, aggregators, and the like. Each image may be analyzed to determine whether it appears to contain a logo. If a potential unidentified logo is found, then at step 715 a plurality of key points may be identified on the unidentified logo. The key points may be placed at any feature of the unidentified logo. For example, key points may be placed at the corners and center of a rectangle, at the center of other geometric shapes such as circles and ovals, at the highest and lowest reaches of the unidentified logo, along the outlines of letters, at discrete disconnected portions of the unidentified logo such as the dot of a lowercase letter "i", along lines where color or shading changes, along lines of textural changes, and the like.

Simple one-to-one matching of key points between a known and unknown image has been implemented in matching algorithms, such as that used in photo imaging software to create a panoramic image from a plurality of images. However, one-to-one matching has a number of drawbacks. Assuming that there are N matched pairs of query key points (i.e., the unidentified logo) and logo key points (i.e., the known logo stored in the database), the possible combinations of the key points may be represented as $N*(N-1)*(N-2)$. Because the number of matched pairs is typically very large, the number of possible combinations may be approximated by $N^3$. In many situations, the computational time and computational resources that would be expended to analyze all of these combinations is prohibitive.

Figure 8:
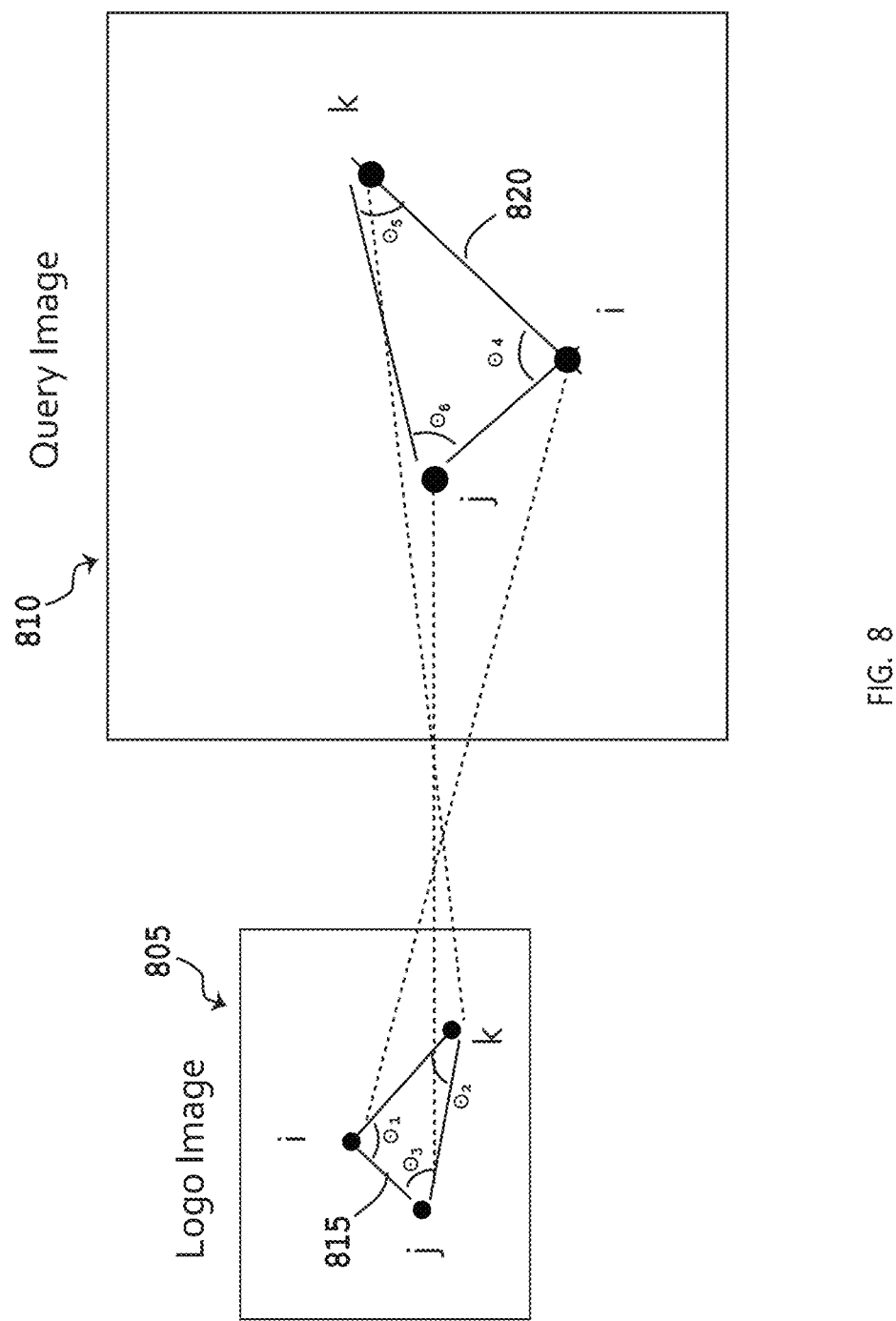
FIG. 8 is a schematic diagram of a matching method using geometric shapes according to various embodiments.
Figure 9:
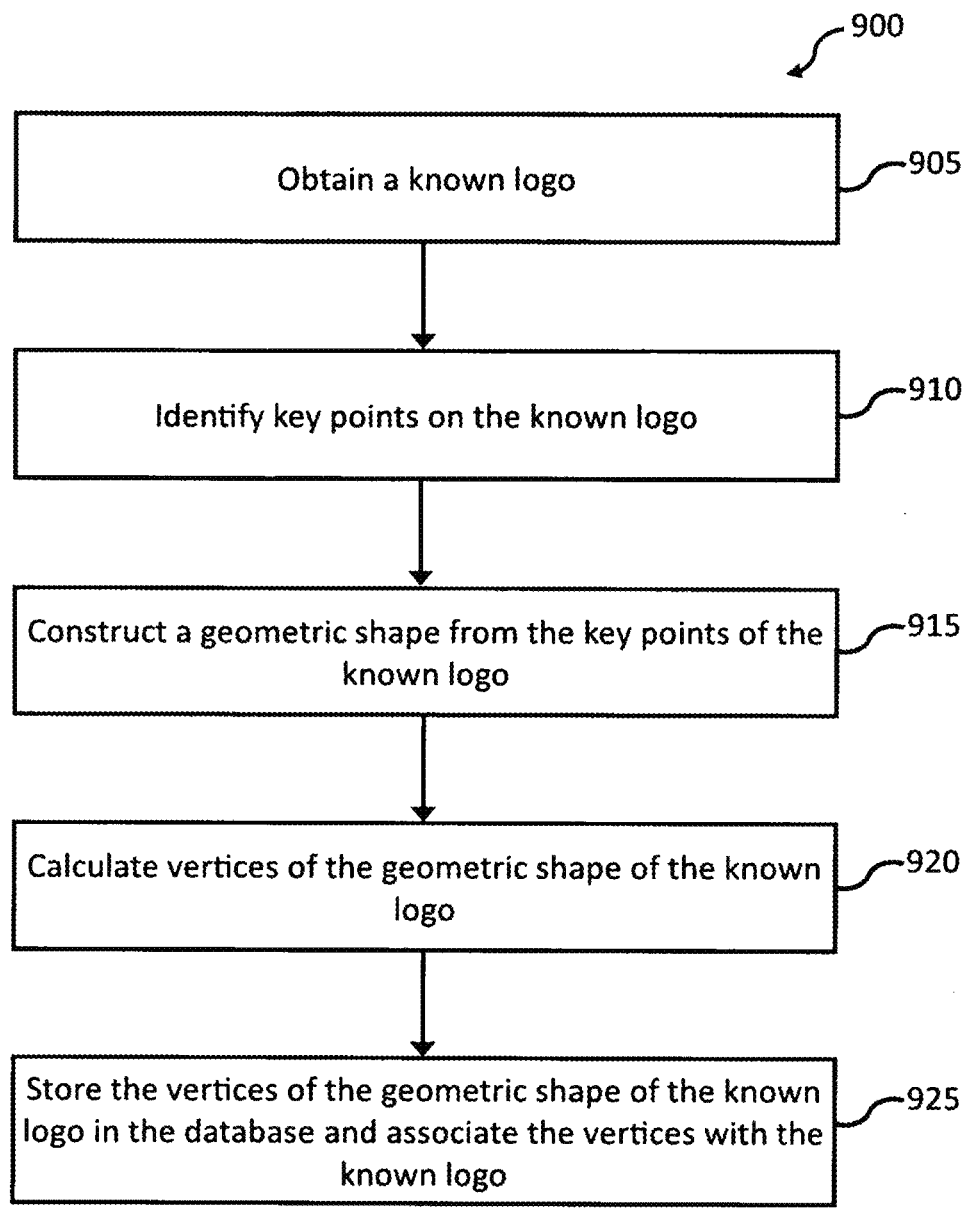
FIG. 9 is a flow diagram of an exemplary method for an image identification system according to various embodiments.

To lessen this computational burden, various embodiments comprise the formation of convex geometric shapes from the key points within the known logo and the key points within the unidentified logo. The simplest convex geometric shape is a triangle and the following discussion centers on analyzing triangular shapes. However, one skilled in the art will readily recognize that the scope of the present disclosure includes any geometric shape, whether convex or concave. Referring now to FIG. 8 along with FIG. 9, a known logo 805 may be identified at step 905, and a plurality of key points may be identified on the known logo at step 910. Three key points of the known logo image 805 may be identified by the tuple (i, j, k). A first triangle 815 may be constructed from these key points at step 915, and the angle of the vertices ($\theta_1$, $\theta_2$, $\theta_3$) may be calculated at step 920. The values of the vertices may populate the database and may be associated with the known logo at step 925.

Returning now to FIG. 7 and still referencing FIG. 8, three key points may be identified on the unidentified logo 810 and a second triangle 820 may be constructed from these key points at step 720. At step 725, the vertices ($\theta_4$, $\theta_5$, $\theta_6$) of the second triangle 820 formed from the unidentified logo 810 may be calculated. The vertices ($\theta_4$, $\theta_5$, $\theta_6$) of the second triangle 820 may then be compared to the vertices ($\theta_1$, $\theta_2$, $\theta_3$) of each first triangle 815 of the known logos in the database. At step 730, a match between a known logo 805 and the unidentified logo 810 occurs when there is a one-to-one correspondence between the two sets of vertices.

Figure 10:
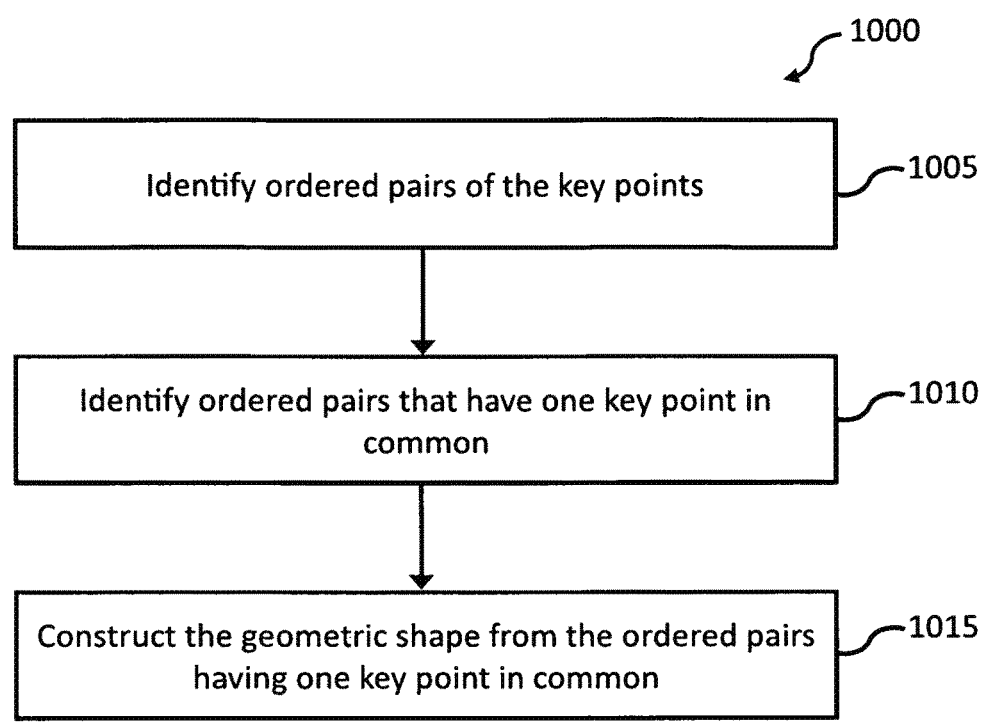
FIG. 10 is a flow diagram of an exemplary method for an image identification system according to various embodiments.

FIG. 10 illustrates a flow diagram of an exemplary method 1000 for constructing a triangle from the identified key points for either the known logo image 805 or the unidentified logo 810. At step 1005, ordered pairs of key points are identified. With reference to FIG. 8, exemplary ordered pairs may be represented by (i,j), (j,k) and (k,i). Each ordered pair also represent a line segment between the ordered pair. Those ordered pairs having one key point in common are identified at step 1010. For the example of FIG. 8, the ordered pairs having one key point in common are (i,j) and (k,i), (i,j) and (j,k), and (j,k) and (k,i). At step 1015, the geometric shape (e.g., a triangle) may be constructed by combining line segments represented by a series of at least three sets of ordered pairs that have one key point in common.

Figure 11:
FIG. 11 is an illustration of key points and geometric shapes formed from the key points on a logo according to various embodiments.

FIG. 8 represents the simple situation where a single geometric shape is constructed on the known logo 805 and a single geometric shape is constructed on the unidentified logo 820. However, the scope of the present disclosure contemplates any number of geometric shapes (the same shapes, such as all triangles, or a mixture of shapes, such as triangles, rectangles, and other polygons). FIG. 11 illustrates an exemplary logo 1100. Triangle ijk may be formed from the key points i, j and k. Similarly, another triangle abc may be formed from the key points a, b and c. Although not shown in FIG. 11, other shapes may be formed from the key points, such as polygon ijkc and polygon abkc.

Figure 12:
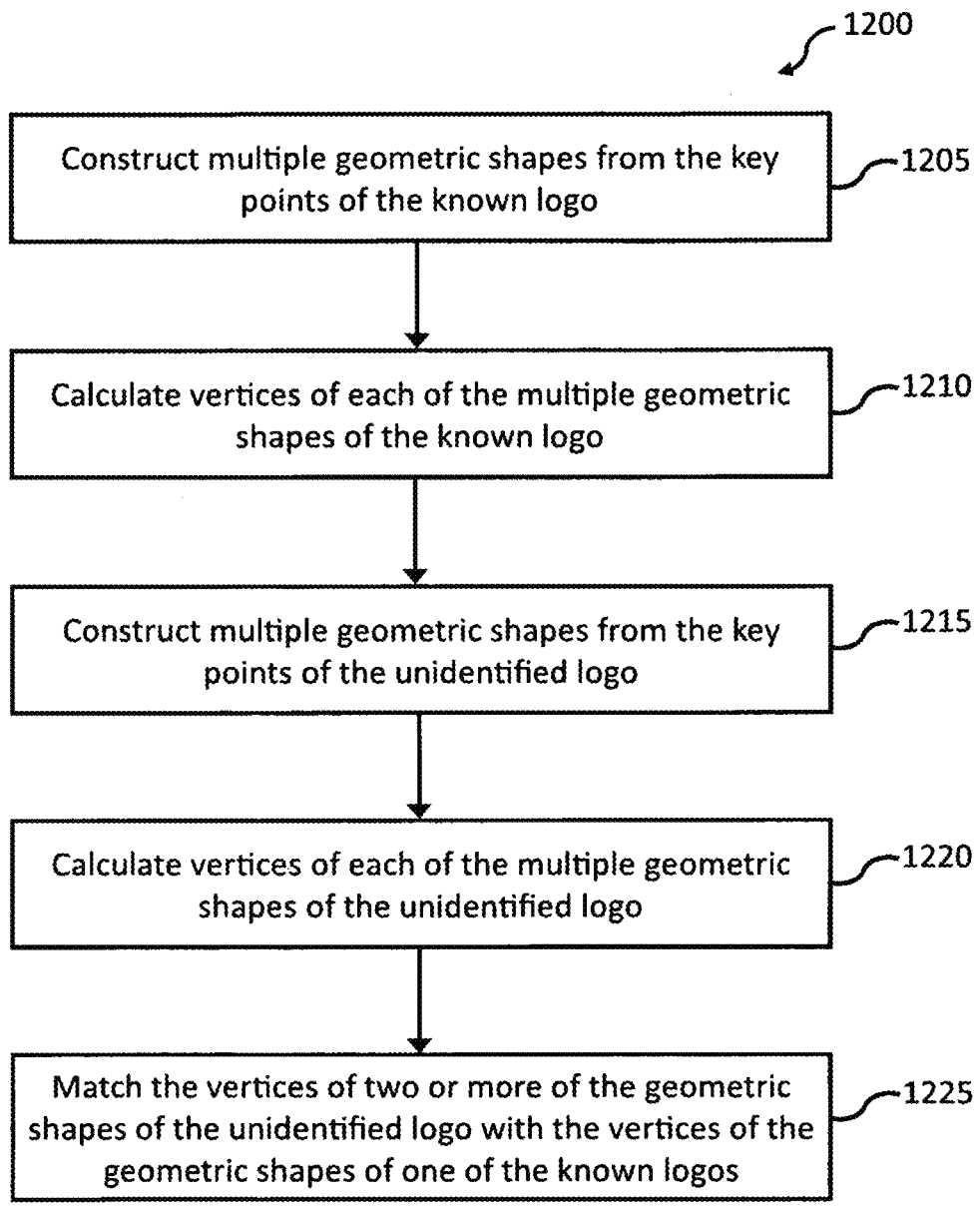
FIG. 12 is a flow diagram of an exemplary method for an image identification system according to various embodiments.

FIG. 12 illustrates a flow chart of an exemplary method 1200 for image identification using multiple geometric shapes. At step 1205, multiple geometric shapes may be constructed from key points of the known logo. As described previously, the vertices of each of the multiple geometric shapes of the known logo may be calculated at step 1210. Multiple geometric shapes may be constructed at step 1215 from the key points of the unidentified logo. At step 1220, the vertices of each of multiple geometric shapes of the unidentified logo may be calculated. At step 1225, a match between a known logo 805 and the unidentified logo 810 occurs when there is a one-to-one correspondence between the vertices of two or more of the geometric shapes of the unidentified logo and the vertices of the geometric shapes of the known logo.

Figure 13:
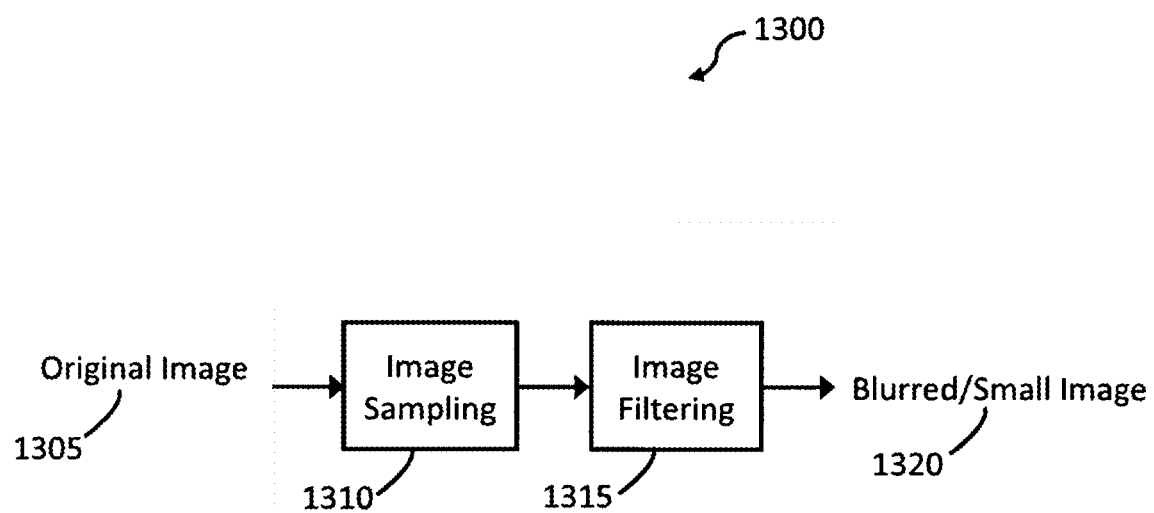
FIG. 13 is a flow diagram of an exemplary method for an image identification system according to various embodiments.

As will often be the case with images posted on social media, the image quality may be lacking, causing the unidentified logo to be blurred. Also, the unidentified logo may be blurred because it is located out of the depth of field of the camera when the image was taken, such as a logo in the background of the image. Image quality plays and important role in logo identification performance. Blurred images, or small images, may be difficult to detect. FIG. 13 is a simplified flow diagram for an exemplary method 1300 for creating a template of a known logo that is blurred or small. At step 1305, an original image of a known logo may be obtained. An image sample technique may be applied to the known logo at step 1310 that may sample the image pixels at different levels. At step 1315, an image filtering technique may be applied to smooth the image pixels and generate multiple levels of blur. At step 1320, multiple synthetic templates of the known logo may be obtained. The key points and geometric shapes may be generated for the blurred images and uploaded to the database as described previously.

Figure 14:
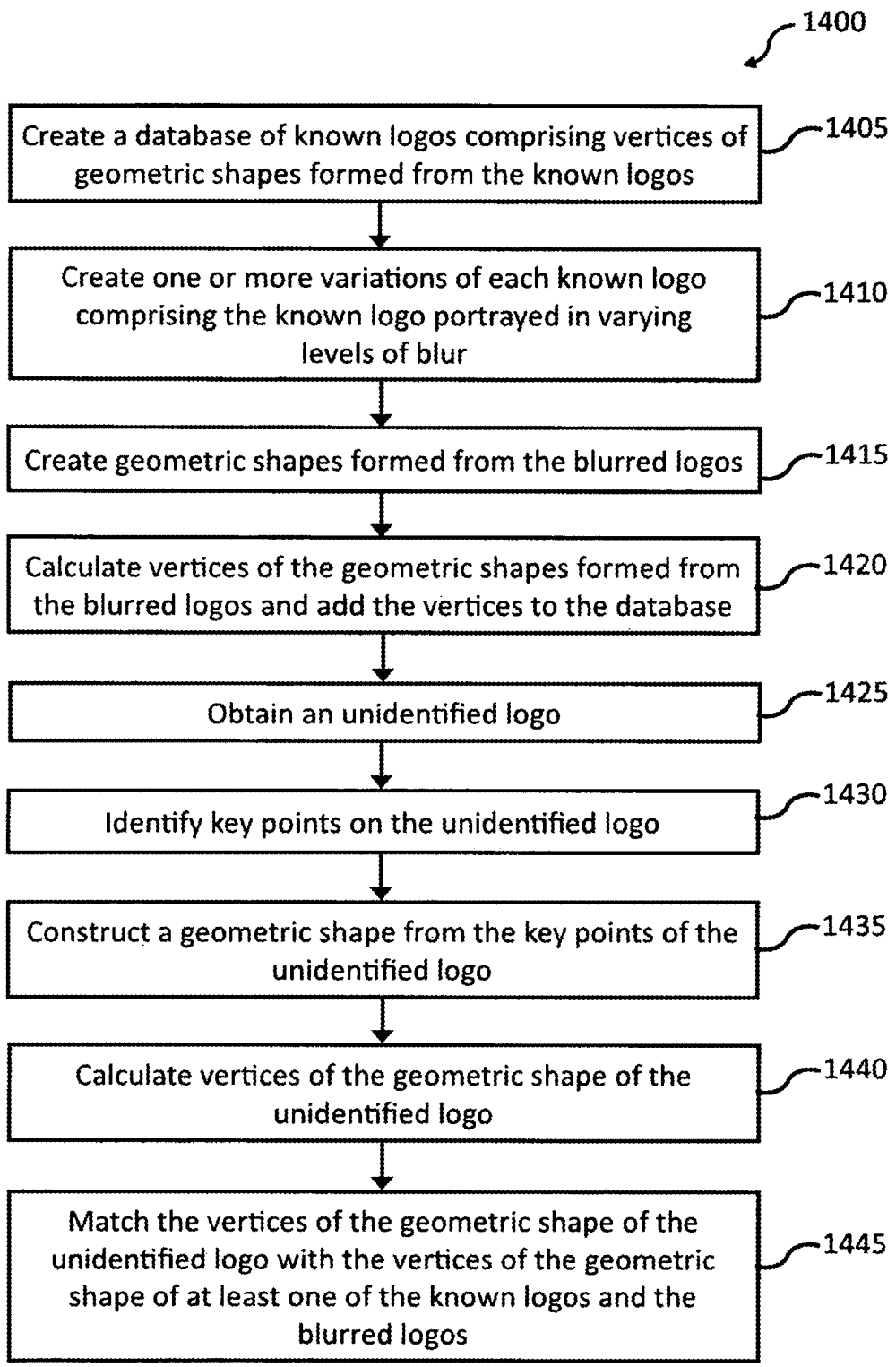
FIG. 14 is a flow diagram of an exemplary method for an image identification system according to various embodiments.

FIG. 14 illustrates a flow diagram for an exemplary method 1400 for blurred image identification. At step 1405, a database may be created of known logos. The database may comprise geometric shapes formed from the known logos. One or more variations of each known logo may be created at step 1410. The variations may comprise the known logo portrayed in varying levels of blur. At step 1415, geometric shapes may be formed from the blurred logos. Vertices of the geometric shapes formed from the blurred logos may be calculated at step 1420, and may then be added to the database. At step 1425, an unidentified logo may be obtained, and key points of the unidentified logo may be identified at step 1430. A geometric shape may be constructed at step 1435 from the key points of the unidentified logo. At step 1435, a match between the known logo and the unidentified logo may occur when there is a one-to-one correspondence between the vertices of the geometric shape of the unidentified logo and the vertices of at least one of the geometric shapes of the known logo and the blurred logos.

Figure 15:
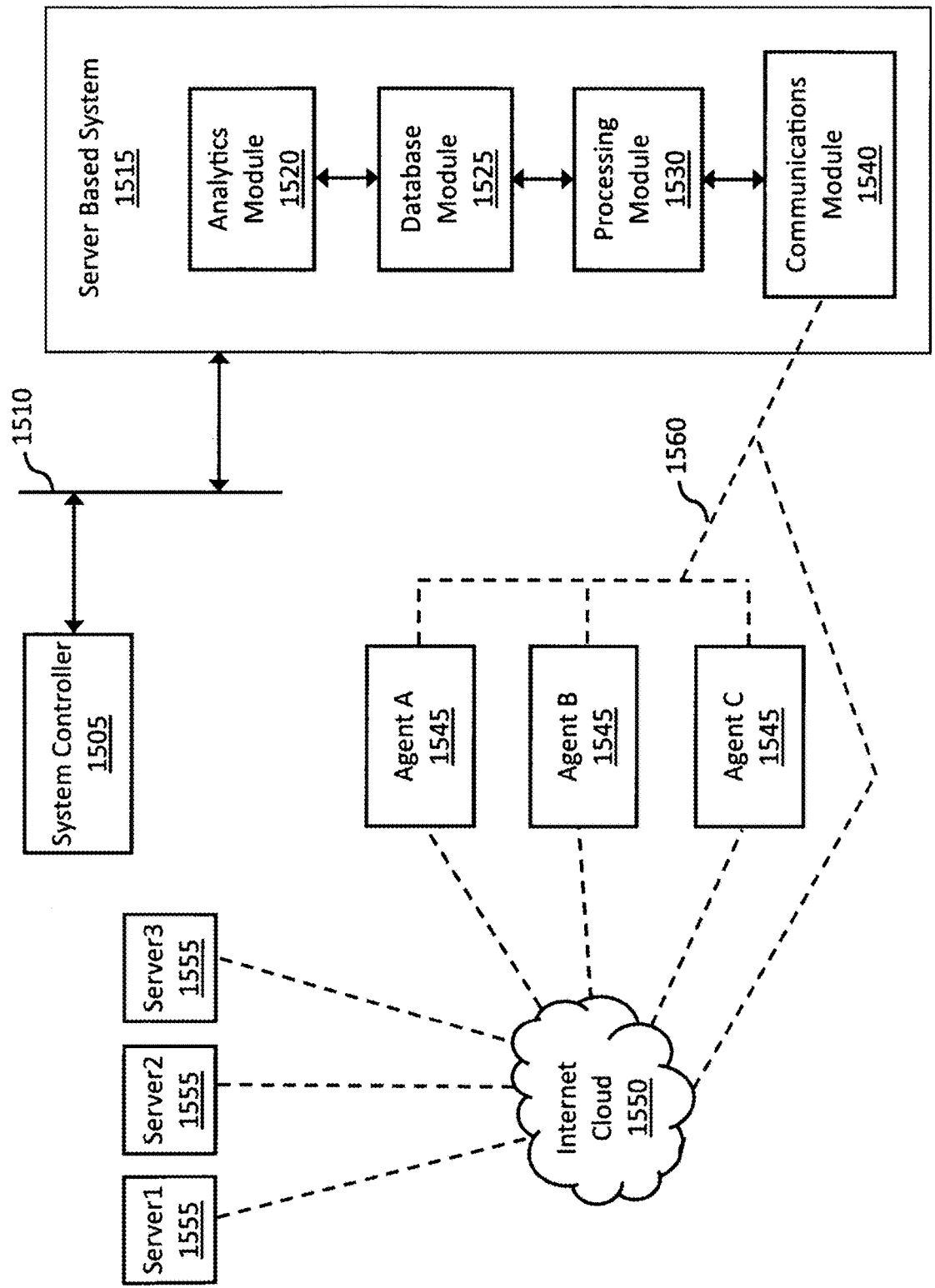
FIG. 15 is a schematic diagram of a system architecture for a secure autonomous intelligent agent server according to various embodiments.

FIG. 15 illustrates a schematic diagram of a system architecture for a secure autonomous intelligent agent server capable of implementing the methods of the present disclosure. A system controller 1505 may be coupled to a server based system 1515 by a bus 1510, or any other connection device known in the art. The system controller 1505 may comprise a specialized chip capable of executing non-transitory computer readable media to perform one or more of the methods 600, 700, 900, 1000, 1200, 1300, 1400.

The server based system 1515 may comprise executable instruction contained at least partially on the non-transitory computer readable media. A database module 1525 may be configured to receive information, as well as new and updated information, store and organize the information, and retrieve the information. The information stored in the database module 1525 may comprise, for example, data representing key points, geometric shapes, and vertices for known logos, blurred images of known logos, and unidentified logos. The database module 1525 may comprise a relational database such that relationships between the data are maintained.

A processing module 1530 may also be present within the server based system 1515 that is communicatively coupled to the database module 1525. The processing module 1530 may execute requests to enter data, retrieve data, analyze data, and handle other operational requests.

Additionally, the server based system 1515 may further comprise a communications module 1540 communicatively coupled to the processing module 1530. The communications module may also be communicatively coupled to a plurality of agents 1545, which may be intelligent agents 1545, as well as communicatively coupled to the Internet such as through a cloud-based computing environment 1550.

The server based system 1515 may also comprise an analytics module 1520 communicatively coupled to the database module 1525. The analytics module may contain and/or process algorithms or other analytical techniques or methods. Processing the algorithms may involve the information stored in the database module 1525.

The agents 1545 may be communicatively coupled to one or more servers 1555 external to the server based system 1515. The servers may contain the information obtained as described above for methods 600, 700, 900, 1000, 1200, 1300, and 1400. The agents 1545 may acquire the desired information from the servers 1555 and transfer the information to the database module 1525 via the communications module 1540 and the processing module 1530. The agents 1545 may acquire the information by executing queries, scraping a network, crawling a network, data mining, data aggregation, or any other data acquisition techniques or methods known in the art.

The system controller 1505 may be communicatively coupled to the communications module 1540, through which the system controller 1505 may communicate via a network 1560 with one or more intelligent agents 1545 and/or the external servers 1555. The network 1560 can be a cellular network, the Internet, an Intranet, or other suitable communications network, and can be capable of supporting communication in accordance with any one or more of a number of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth, Wireless LAN (WLAN) protocols/techniques.

The intelligent agent 1545, according to some exemplary embodiments, may be a non-generic computing device comprising non-generic computing components. The intelligent agent 1545 may comprise dedicated hardware processors to determine, transmit, and receive video and non-video data elements. In further exemplary embodiments, the intelligent agent 1545 may comprise a specialized device having circuitry and specialized hardware processors, and is artificially intelligent, including machine learning. Numerous determination steps by the intelligent agent 1545 as described herein can be made to video and non-video data by an automatic machine determination without human involvement, including being based on a previous outcome or feedback (e.g., automatic feedback loop) provided by the networked architecture, processing and/or execution as described herein.

According to various embodiments, the system controller 1505 may communicate with a cloud-based computing environment 1550, 1555 that collects, processes, analyzes, and publishes datasets. In general, a cloud-based computing environment 1550, 1555 may be a resource that typically combines the computational power of a large grouping of processors and/or that combines the storage capacity of a large group of computer memories or storage devices. For example, systems that provide a cloud resource can be utilized exclusively by their owners, such as Google™ or Amazon™, or such systems can be accessible to outside users who deploy applications within the computing infrastructure to obtain the benefits of large computational or storage resources.

The cloud 1550 can be formed, for example, by a network of web servers with each server (or at least a plurality thereof) providing processor and/or storage resources. These servers can manage workloads provided by multiple users (e.g., cloud resource customers or other users). Typically, each user places workload demands upon the cloud 1550 that vary in real-time, sometimes dramatically. The nature and extent of these variations typically depend upon the type of business associated with each user.

Some of the above-described functions can be composed of instructions that are stored on storage media (e.g., computer-readable media). The instructions can be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

It is noteworthy that any hardware platform suitable for performing the processing described herein is suitable for use with the technology. The terms "computer-readable medium" and "computer-readable media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic media, a CD-ROM disk, digital video disk (DVD), any other optical media, any other physical media with patterns of marks or holes, a RAM, a PROM, an EPROM, an EEPROM, a FLASHEPROM, any other memory chip or data exchange adapter, a carrier wave, or any other media from which a computer can read.

Various forms of computer-readable media can be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

While the present disclosure has been described in connection with a series of preferred embodiments, these descriptions are not intended to limit the scope of the disclosure to the particular forms set forth herein. The above description is illustrative and not restrictive. Many variations of the embodiments will become apparent to those of skill in the art upon review of this disclosure. The scope of this disclosure should, therefore, be determined not with reference to the above description, but instead should be determined with reference to the appended claims along with their full scope of equivalents. The present descriptions are intended to cover such alternatives, modifications, and equivalents as can be included within the spirit and scope of the disclosure as defined by the appended claims and otherwise appreciated by one of ordinary skill in the art. In several respects, embodiments of the present disclosure can act to close the loopholes in the current industry practices in which good business practices and logic are lacking because it is not feasible to implement with current resources and tools.

As used herein, the terms "having", "containing", "including", "comprising", and the like are open ended terms that indicate the presence of stated elements or features, but do not preclude additional elements or features. The articles "a", "an" and "the" are intended to include the plural as well as the singular, unless the context clearly indicates otherwise.

What is claimed is:

1. A method for image identification using a secure autonomous intelligent server, the method comprising:
   creating a database of known logos, the database comprising vertices of geometric shapes formed from the known logos;
   wherein the creating the database of known logos comprises:
   obtaining a known logo;
   creating blurred variations of the known logo, the blurred variations comprising the known logo portrayed in varying levels of blur;

identifying key points on the known logo and the blurred variations;
constructing a geometric shape from the key points of the known logo and the blurred variations;
calculating vertices of the geometric shape of the known logo and the blurred variations; and
storing the vertices of the geometric shape of the known logo and the blurred variations in the database and associating the vertices with the known logo and the blurred variations;
obtaining an unidentified logo representing an object in a query image;
identifying key points on the unidentified logo;
constructing a geometric shape from the key points of the unidentified logo;
calculating vertices of the geometric shape of the unidentified logo;
matching the vertices of the geometric shape of the unidentified logo with the vertices of the geometric shape of at least one of the known logos and the blurred variations;
constructing multiple geometric shapes comprising a plurality of triangles from the key points of the known logo and the blurred variations;
calculating vertices of each of the multiple geometric shapes of the known logo and the blurred variations;
constructing multiple geometric shapes comprising a plurality of triangles from the key points of the unidentified logo;
calculating vertices of each of the multiple geometric shapes of the unidentified logo; and
matching the vertices of two or more of the geometric shapes comprising the plurality of triangles of the unidentified logo with the vertices of the geometric shapes comprising the plurality of triangles of one of the known logos and the blurred variations.

2. The method of claim 1, wherein the constructing a geometric shape from the key points of the unidentified logo comprises:
identifying ordered pairs of the key points;
identifying the ordered pairs that have one key point in common; and
constructing the geometric shape from the ordered pairs having one key point in common.

3. The method of claim 1, wherein the data base of vertices of geometric shapes formed from the known logos comprises vertices of triangles.

4. The method of claim 1, wherein the constructing the geometric shape from the key points of the known logo and the blurred variations comprises constructing a triangle from the key points of the known logo and the blurred variations.

5. The method of claim 1, wherein the obtaining the unidentified logo comprises:
scanning a computer network for posted images; and
identifying logos within the posted images.

6. The method of claim 5, wherein the computer network comprises social media sites.

7. The method of claim 1, the key points placed at corners and a center of a rectangle of the unidentified logo.

8. The method of claim 1, the key points placed at a highest and a lowest reach of the unidentified logo.

9. The method of claim 1, the key points placed at discrete disconnected portions of the unidentified logo.

10. A system for image identification, the system comprising:
at least one processor; and
a memory storing processor-executable instructions, wherein the at least one processor is configured to implement the following operations upon executing the processor-executable instructions:
creating a database of known logos, the database comprising vertices of geometric shapes formed from the known logos;
wherein the creating the database of known logos comprises:
obtaining a known logo;
creating blurred variations of the known logo, the blurred variations comprising the known logo portrayed in varying levels of blur;
identifying key points on the known logo and the blurred variations;
constructing a geometric shape from the key points of the known logo and the blurred variations;
calculating vertices of the geometric shape of the known logo and the blurred variations; and
storing the vertices of the geometric shape of the known logo and the blurred variations in the database and associating the vertices with the known logo and the blurred variations;
obtaining an unidentified logo representing an object in a query image;
identifying key points on the unidentified logo;
constructing a geometric shape from the key points of the unidentified logo;
calculating vertices of the geometric shape of the unidentified logo;
matching the vertices of the geometric shape of the unidentified logo with the vertices of the geometric shape of at least one of the known logos and the blurred variations;
constructing multiple geometric shapes comprising a plurality of triangles from the key points of the known logo and the blurred variations;
calculating vertices of each of the multiple geometric shapes of the known logo and the blurred variations;
constructing multiple geometric shapes comprising a plurality of triangles from the key points of the unidentified logo;
calculating vertices of each of the multiple geometric shapes of the unidentified logo; and
matching the vertices of two or more of the geometric shapes comprising the plurality of triangles of the unidentified logo with the vertices of the geometric shapes comprising the plurality of triangles of one of the known logos and the blurred variations.

11. The system of claim 10, wherein the constructing the geometric shape from the key points of the unidentified logo comprises:
identifying ordered pairs of the key points;
identifying ordered pairs that have one key point in common; and
constructing the geometric shape from the ordered pairs having one key point in common.

12. The system of claim 10, wherein the database of vertices of geometric shapes formed from the known logos comprises vertices of triangles.

13. The system of claim 10, wherein the constructing the geometric shape from the key points of the known logo and the blurred variations comprises constructing a triangle from the key points of the known logo and the blurred variations.

14. The system of claim 10, wherein the obtaining an unidentified logo comprises:
scanning a computer network for posted images; and
identifying logos within the posted images.

15. The system of claim 14, wherein the computer network comprises social media sites.

16. A method for image identification using a secure autonomous intelligent server, the method comprising:
- creating a data base of known logos, the data base comprising vertices of geometric shapes formed from the known logos;
- wherein the creating the database of known logos comprises:
- obtaining a known logo;
  - creating blurred variations of the known logo, the blurred variations comprising the known logo portrayed in varying levels of blur; wherein the creating the blurred variations of the known logo comprises:
  - receiving an original image of a known logo;
  - applying an image sample technique to the known logo;
  - applying an image filtering technique to the known logo to smooth image pixels and generate multiple levels of blur; and
  - receiving multiple synthetic templates of the known logo;
  - identifying key points on the known logo and the blurred variations;
  - constructing a geometric shape from the key points of the known logo and the blurred variations;
  - calculating vertices of the geometric shape of the known logo and the blurred variations; and
  - storing the vertices of the geometric shape of the known logo and the blurred variations in the database and associating the vertices with the known logo and the blurred variations;
- obtaining an unidentified logo representing an object in a query image;
- identifying key points on the unidentified logo;
- constructing a geometric shape from the key points of the unidentified logo;
- calculating vertices of the geometric shape of the unidentified logo;
- matching the vertices of the geometric shape of the unidentified logo with the vertices of the geometric shape of at least one of the known logos and the blurred variations;
- constructing multiple geometric shapes comprising a plurality of triangles from the key points of the known logo and the blurred variations;
- calculating vertices of each of the multiple geometric shapes of the known logo and the blurred variations;
- constructing multiple geometric shapes comprising a plurality of triangles from the key points of the unidentified logo;
- calculating vertices of each of the multiple geometric shapes of the unidentified logo; and
- matching the vertices of two or more of the geometric shapes comprising the plurality of triangles of the unidentified logo with the vertices of the geometric shapes comprising the plurality of triangles of one of the known logos and the blurred variations.

* * * * *